(12) United States Patent
Jacques et al.

(10) Patent No.: US 7,570,497 B2
(45) Date of Patent: Aug. 4, 2009

(54) DISCONTINUOUS QUASI-RESONANT FORWARD CONVERTER

(75) Inventors: Russell Jacques, Burton Green (GB); David Robert Coulson, Comberton (GB)

(73) Assignee: Cambridge Semiconductor, Cambridge (GB)

( * ) Notice: Subject to any disclaimer, the term of this patent is extended or adjusted under 35 U.S.C. 154(b) by 355 days.

(21) Appl. No.: 11/449,486

(22) Filed: Jun. 8, 2006

(65) Prior Publication Data

US 2007/0274108 A1 Nov. 29, 2007

(30) Foreign Application Priority Data

May 26, 2006 (GB) .................................. 0610422.8

(51) Int. Cl.
*H02M 3/335* (2006.01)
(52) U.S. Cl. ............... 363/21.03; 363/21.08; 363/21.09
(58) Field of Classification Search .................. 363/16, 363/21.03, 21.08, 21.1, 21.04, 21.07, 21.09
See application file for complete search history.

(56) References Cited

U.S. PATENT DOCUMENTS

| | | | |
|---|---|---|---|
| 4,415,959 A | | 11/1983 | Vinciarelli |
| 4,788,634 A | * | 11/1988 | Schlecht et al. .......... 363/21.03 |
| 4,866,367 A | * | 9/1989 | Ridley et al. ................. 323/287 |
| 4,928,220 A | | 5/1990 | White |
| 5,317,499 A | | 5/1994 | Brakus |
| 5,608,613 A | * | 3/1997 | Jansen ..................... 363/21.03 |
| 6,687,137 B1 | | 2/2004 | Yasumura |
| 7,019,988 B2 | * | 3/2006 | Fung et al. ............... 363/21.01 |

| | | | |
|---|---|---|---|
| 2005/0152160 A1 | | 7/2005 | Fung et al. |

FOREIGN PATENT DOCUMENTS

| | | |
|---|---|---|
| EP | 0 055 064 A2 | 6/1982 |
| EP | 0 074 399 | 8/1988 |
| EP | 0 658 968 A1 | 6/1995 |
| EP | 1 156 580 | 11/2001 |
| EP | 1 432 108 A1 | 6/2004 |
| EP | 1 508 961 | 2/2005 |
| GB | 2 151 822 A | 7/1985 |
| JP | 05292741 A | 5/1993 |

(Continued)

OTHER PUBLICATIONS

Shukla J et al: "A novel active resonant snubber for single switch unity power factor three-phase diode rectifiers" Power Electronics Specialists Conference, 2004. PESC 04. 2004 IEEE 35$^{TH}$ Annual Aachen, Germany Jun. 20-25, 2004, Piscataway, NJ, USA, IEEE, US, Jun. 20, 2004, pp. 3818-3823vol. 5, XP010738323 ISBN: 0-7903-8399-0 paragraph [Introduction]; figure 1.

(Continued)

*Primary Examiner*—Shawn Riley

(57) ABSTRACT

A discontinuous resonant forward power converter including a controller having an output coupled to a controllable switch and which is configured to control the switch such that a voltage waveform on a secondary winding of a transformer of the converter has a first portion during which the switch is on and current flows into an output node of the converter which is coupled to the output rectifier and to a smoothing capacitor, and which has a second substantially resonant portion during which the switch and an output rectifier are both off. Substantially no current flows into the output node during the second portion of said voltage waveform.

19 Claims, 14 Drawing Sheets

FOREIGN PATENT DOCUMENTS

| | | |
|---|---|---|
| JP | 09182424 A | 7/1997 |
| JP | 2002345236 A | 11/2002 |

OTHER PUBLICATIONS

International Search Report for corresponding PCT/GB2007/050276.

Search Report Under Section 17 for corresponding GB0610422.8, completed Mar. 5, 2007.

International Search Report for corresponding PCT/GB2007/050276, completed Sep. 1, 2008 by M. Marannino.

UK Search Report for corresponding GB0811374.8 completed Sep. 30, 2008.

UK Search Report for corresponding GB0811279.9 completed Oct. 2, 2008.

EPODOC/EPO JP529741, Feb. 10, 2008.

EPODOC/EPO JP918424, Feb. 10, 2008.

EPODOC/EPO JP2002345236, Sep. 29, 2008.

* cited by examiner

US 7,570,497 B2

DISCONTINUOUS QUASI-RESONANT FORWARD CONVERTER

FIELD OF THE INVENTION

This invention generally relates to forward power converters, and more particularly to improved systems and methods for operating such converters, and to controllers for implementing these systems and methods.

BACKGROUND TO THE INVENTION

FIG. 1 (which is taken from U.S. Pat. No. 4,688,160) shows an example of a forward power converter comprising a dc input 101, 102 coupled to the primary winding 109 of a transformer 110. The primary winding 109 is connected in series with a switching device 105, here a bipolar transistor, which switches on and off, during an on period building up magnetising flux in the primary winding 109, which drives a current in a secondary winding 111 of the transformer. Unlike a so-called flyback converter, in a forward converter the primary and secondary windings have matched polarities, as indicated by the dots on the windings in FIG. 1. The output from the transformer 110 is rectified by a rectifier 114 and smoothed by a smoothing capacitor 119 to provide a dc output 121, 122. When switch 105 is off the core of the transformer is "reset" allowing the magnetising flux to return to its initial state. In the example of FIG. 1 (U.S. Pat. No. 4,688,160) this is performed by resonant action between the magnetising inductance of transformer 110 and a capacitor 113 shunting diode 114, returning energy to the input voltage source.

The circuit of FIG. 1 includes a large output choke 117 between rectifier 114 and smoothing capacitor 119, and a freewheeling or "flyback" diode 115 across the series combination of choke 117 and smoothing capacitor 119. This is because when the switch 105 is turned off, because the primary and secondary windings have the same sense, rectifier 114 immediately becomes non-conducting. The function of the freewheeling diode 115 is to allow the choke 117 to maintain a continuous output current into output node "X" when switch 105 is off by providing a path for this current.

FIG. 1 shows a conventional, continuous forward converter. There are many other prior art documents describing such converters, including, for example, U.S. Pat. Nos. 4,415,959; 6,760,236; 6,304,463; 6,252,781; and the reference design SLUA276 for the Texas Instruments UCC38C42. In some of these later circuits the secondary side diodes are replaced by synchronous rectifiers embodied in MOS transistors. Other background prior art can be found in U.S. Pat. No. 4,788,634 which describes a resonant forward converter in which natural self-inductance of the transformer in parallel with the transformer provides a resonant "ring" so that the switching circuit can be self-resonant; and U.S. 2005/0270809 (WO 2004/057745) which describes use of an auxiliary transformer in a current limiting circuit.

The inventors have recognised that improved operation, such as improved regulation and start-up may be achieved by use of switch control in a discontinuous current flow mode.

SUMMARY OF THE INVENTION

According to a first aspect of the invention there is therefore provided a discontinuous resonant forward converter for converting an input dc voltage to an output dc voltage, the converter comprising: first and second dc inputs; a transformer having primary and secondary windings with matched polarities; a controllable switch for switching power from said dc inputs through said primary winding of said transformer, said controllable switch and said primary winding of said transformer being coupled in series between said first and second dc voltage inputs; first and second dc voltage outputs; a rectifier coupled to said secondary winding of said transformer, said rectifier and said secondary winding of said transformer being coupled in series between said first and second dc voltage outputs; a smoothing capacitor having a first connection coupled to receive dc power from said rectifier at a first connection node, said first connection node being coupled to said first dc voltage output, said smoothing capacitor having a second connection coupled to said second dc voltage output; and a controller having an output coupled to said controllable switch and being configured to control said switch such that a voltage waveform on said secondary winding has a first portion during which said switch is on and current flows into said first connection node, and second substantially resonant portion during which said switch and said rectifier are both off; and wherein substantially no current flows into said first connection node during said second portion of said voltage waveform.

A connection between the rectifier and the first connection node may include a small inductor but substantially no current flows in this inductance during the second, resonant portion of the waveform. There is, however, no need for a large choke as used in the continuous forward converters mentioned in the introduction. If an inductor is present this may have a value of less than 10%, 5%, 2%, 1% or 0.1% of the primary side magnetising inductance of the transformer. Embodiments of the forward converter lack a freewheeling rectifier coupled to the secondary winding. Adding a small amount of output inductance can assist in implementing the current limit function (as described later), as well as regulation and start-up providing that the converter remains discontinuous.

As described above, a forward converter according to an embodiment of the invention employs controlled switching of the switch rather than relying on self-oscillation to directly control the power switch. The inventors have nonetheless recognised that embodiments of the forward converter may tolerate variations in component parameters, in particular the inductance of the transformer and the capacitance of the resonant capacitor, both of which contribute to variations in the resonant frequency. The inventors have recognised that in a discontinuous resonant forward converter, counter-intuitively a substantially fixed frequency oscillator may be employed and nonetheless achieve robustness with respect to component value variations, which in turn facilitates the use of components with larger tolerances and hence reduced cost implementations.

In particular, broadly speaking in implementations of the forward converter the voltage waveform on the secondary winding may be approximately divided into three (in general not equal) periods, the first portion of the voltage waveform described above occupying one of these three periods, the other two periods being occupied by the second, substantially resonant portion of the voltage waveform and then a period of "dead time" while the switch voltage is close to zero volts. (The waveform is clamped on the primary side and, in embodiments with a bipolar transistor switch described later, in fact is clamped at one diode drop away from zero volts, because there is an intrinsic diode in the switch). When the secondary side voltage waveform is at substantially zero volts, this is a good time at which to turn on the primary side switch again, to reduce electromagnetic interference (EMI) and to achieve good efficiency. There is, however, a relatively long period during which this voltage waveform remains at substantially zero volts, and thus the frequency of the oscillator may be selected to allow for some variation in the duration of the half cycle of resonance. If the transformer voltage is already at substantially zero volts switching on the switch does not cause any significant voltage change.

Thus by controlling the drive to the switch so that the off period is sufficiently long the switch does not switch on again until the half cycle of sinusoidal resonance is over and the waveform is approximately at zero volts. Preferably, such a substantially fixed frequency oscillator has a duty cycle (on period as a percentage of the total period) of less than 70%. Eventually the secondary winding voltage waveform begins to sinusoidally ring again and it is therefore preferable that the off period of the duty cycle is sufficiently short to avoid this region of the waveform. Preferably, therefore, the duty cycle of the oscillator is such that the percentage of the on period of the total period is greater than 5%, preferably greater than 10%, in embodiments greater than 30%. In general the duty cycle can vary depending on the design and, in mains powered embodiments, on the mains input voltage. For example a 110V version may operate with an on duty cycle in the region of 60% to 70% whilst a 250V version may have an on duty cycle of 30% to 40%; other designs may have a duty cycle in the region of 40% to 60%, for example approximately 50%.

Additionally or alternatively one or both of pulse width modulation (PWM) and pulse frequency modulation (PFM) may be employed whilst maintaining discontinuous resonance. This facilitates regulation of the output of the forward converter, in particular under varying load conditions. However preferably the switch controller is configured to control the switch by employing a pair of control signals, a first to turn the switch on, and a second to turn the switch off. This facilitates implementation of a range of different control strategies, optionally in the context of PWM and/or PFM. In particular this facilitates the implementation of zero volts switching (ZVS), and of over current protection (OCP) in the context of a discontinuous resonant forward converter.

Thus in some preferred embodiments a first control signal controls the switch on and a second control signal controls the switch off. The first control signal may, in embodiments, be responsive to detection of a substantially zero volt condition on the primary winding voltage. This may either be used to turn the power switch on immediately, or after a delay. Alternatively a voltage from an auxiliary winding of the transformer may be employed. More generally the sensed voltage may be compared with a reference level rather than necessarily zero volts. In some preferred embodiments a non-zero reference point, say 50 volts, on the sensed waveform is detected and used to predict the time at which the sensed voltage goes to zero, or close to zero (the time is approximately known since the reference level is known). This can facilitate implementation of the controller. In a further alternative the power switch may be turned on in response to a sensed current through the primary winding and switch, for example sensed by measuring a voltage drop across a current sensing resistor. This may be employed, for example, to delay the turn on of the power switch.

The second control signal, which turns the power switch off, may also be responsive to one or more of a number of different variables. For example in a simple embodiment the second control signal may control the switch off after a time delay from the first control signal controlling the power switch on. Optionally this time delay may be variable, and in this way pulse width modulation may be implemented. The pulse width may be responsive to, for example, a voltage on the primary or on an auxiliary winding of the transformer and/or to a sensed voltage on the secondary side of the forward converter. It will be recognised that, in general, the voltage on the primary (or secondary) winding of the transformer may be sensed either directly or indirectly. In general, the second control signal may be responsive to any sensed primary or secondary side voltage or current.

In some particularly preferred embodiments the second control signal implements an over current protection (OCP) function by substantially immediately switching the power switch off when an over current condition is detected, for example via voltage sensed from a sensor such as a current sensing resistor in series with the switch. This can be used to implement a cycle-by-cycle OCP and facilitates a rapid response when a switch current greater than a threshold level is detected.

In some preferred embodiments the controller implements a current limiting mode which includes increased frequency operation. Thus in embodiments the controller increases a frequency of the drive signal when current limiting. This can help to avoid a runaway process (as described later) which, for certain types of load can cause the output voltage to continuously fall. In embodiments a threshold current for current limiting is adjusted in response to changing the frequency or pulse width of the drive signal, and in particular the threshold current may be increased as the drive pulse width is reduced or the drive frequency is increased. As mentioned above, the output side of the forward converter may include a small inductance and still operate in a discontinuous resonant mode, and the inclusion of such an inductance can help to limit (regulate) the output current in overload, in particular by facilitating regulation of the output current as described above. In embodiments this inductance may be provided by leakage or parasitic inductance in the circuit, in particular leakage inductance of the transformer. In embodiments the transformer may be configured to provide a leakage inductance to contribute to a desired value of output inductance for the forward converter.

One particular difficulty, often encountered with forward power converter designs and particularly acute in a converter without series inductance, is ensuring reliable start-up. This is because at start-up the forward converter output effectively appears as a short circuit which can potentially damage the power switch or, where a current limiting arrangement is in place, which can trigger the current limiting and hence prevent the output voltage from reaching its proper value. Embodiments of the forward converter we describe, which employ an arrangement to turn the power switch on and off in a controlled manner facilitate management of a start-up of the forward converter and, in particular, enable a frequency of a drive signal to the power switch to be increased at start-up. This takes the converter out of its resonant mode of operation at start-up and enables more power to be transferred to the output whilst still protecting the power switch. The start-up condition may straightforwardly be detected on the primary side of the forward converter or, indirectly, by making use of a current sense/limit system in the forward converter.

In some particularly preferred embodiments the above-described controller is implemented in a single integrated circuit. This IC may implement one or more of a range of controlled strategies as described above. In some preferred implementations of the IC, however, the power switch is left off the chip, for flexibility.

Thus in another aspect the invention provides a controller for controlling a forward converter for converting an input dc voltage to an output dc voltage, the converter comprising: first and second dc inputs; a transformer having primary and secondary windings with matched polarities; a controllable switch for switching power from said dc inputs through said primary winding of said transformer, said controllable switch and said primary winding of said transformer, being coupled in series between said first and second dc voltage inputs; first and second dc voltage outputs; a rectifier coupled to said secondary winding of said transformer, said rectifier and said secondary winding of said transformer being coupled in series between said first and second dc voltage outputs; and a smoothing capacitor having a first connection coupled to receive dc power from said rectifier at a first connection node, said first connection node being coupled to said first dc voltage output, said smoothing capacitor having a second connection coupled to said second dc voltage output; and wherein said controller has an output coupled to said controllable switch and is configured to control said switch such that a voltage waveform on said secondary winding has a first portion during which said switch is on and current flows into said first connection node, and second substantially resonant portion during which said switch and said rectifier are both off; and wherein substantially no current flows into said first connection node during said second portion of said voltage waveform; whereby said forward converter is controllable by said controller to operate in a discontinuous forward voltage conversion mode.

Preferably the controller is implemented on a single integrated circuit as described above.

In further aspects the invention provides a method of controlling a forward converter as described above to operate in a discontinuous resonant mode by controlling the controllable (power) switch such that a voltage waveform on the secondary winding has a first portion during which the switch is on and current flows into the first connection node and the second substantially resonant portion during which the switch is off and wherein substantially no current flows into the first connection node during the second portion of the voltage waveform.

A controller as described above may be implemented in either analogue or digital circuitry. Thus, where the controller is implemented mainly or wholly in digital circuitry the invention further provides a carrier medium carrying processor control code such as RTL (Register Transfer Level) or SystemC defining hardware to implement the controller.

The skilled person will understand that a discontinuous resonant forward converter as described above may be implemented using a range of circuit topologies including, but not limited to, those described later. The transformer, for example, may comprise an auto-transformer.

BRIEF DESCRIPTION OF THE DRAWINGS

These and other aspects of the invention will now be further described, by way of example only, with reference to the accompanying figures in which:

FIGS. 2a and 2b show, respectively, an embodiment of a discontinuous resonant forward converter, and an example timing and control arrangement for the converter of FIG. 2a;

DETAILED DESCRIPTION OF PREFERRED EMBODIMENTS

Broadly speaking we will describe techniques for implementing a resonant discontinuous forward converter (RDFC) which employ a control system to turn a power switch of the RDFC on and off in a controlled manner. As previously described, the control system may operate in an uncontrolled, fixed frequency mode or the control system may sense from one or more inputs and decide when to turn the power switch on and off responsive to this sensing, for example to implement pulse width and/or frequency modulation. This facilitates regulation of the RDFC which, in detail, may be performed using a range of algorithms. One technique uses the control system to operate the RDFC to compensate for circuit variables and to operate in a zero voltage switching (ZVS) mode. The converter may also control the switching frequency during start-up and/or current limit in order to protect the power switch and increase the energy transferred to the load. The control system is preferably implemented using a control IC (integrated circuit).

As mentioned above, the RDFC operates without a freewheeling or flyback diode, and with or without an output inductor. However, if present the output inductor is sufficiently small to ensure that the forward converter operates in a discontinuous mode and substantially resonantly that is at or close to resonance.

Figure 2A:
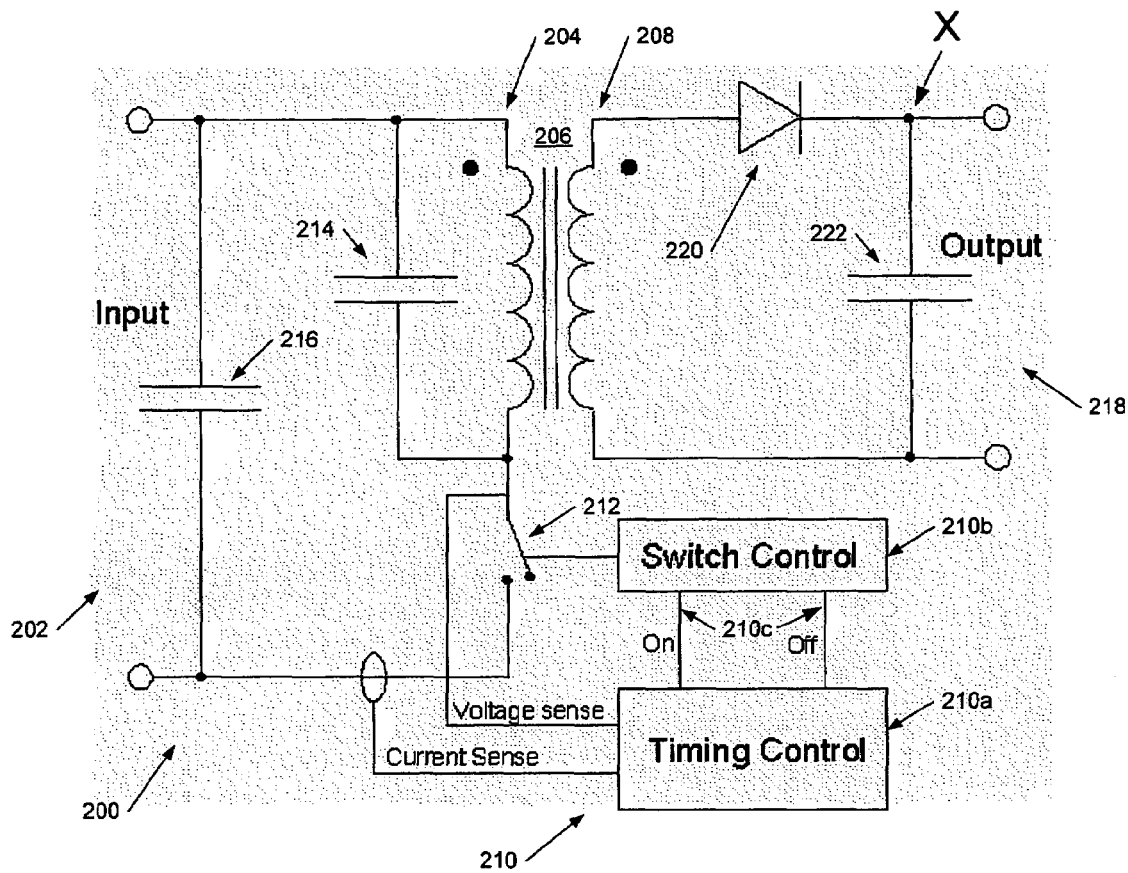
Figure 2B:
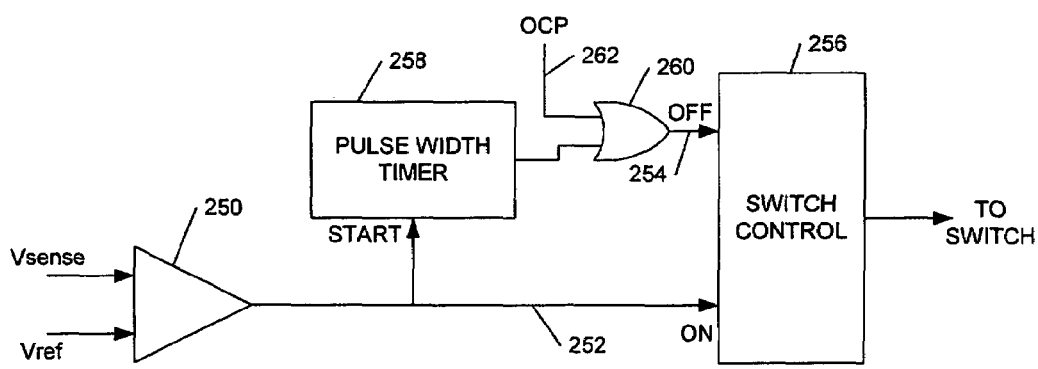

Referring now to FIG. 2a, this shows an embodiment of discontinuous resonant forward converter 200 according to the invention. FIG. 2b shows an example timing and control system 210 for the forward converter of FIG. 2a.

Figure 1:
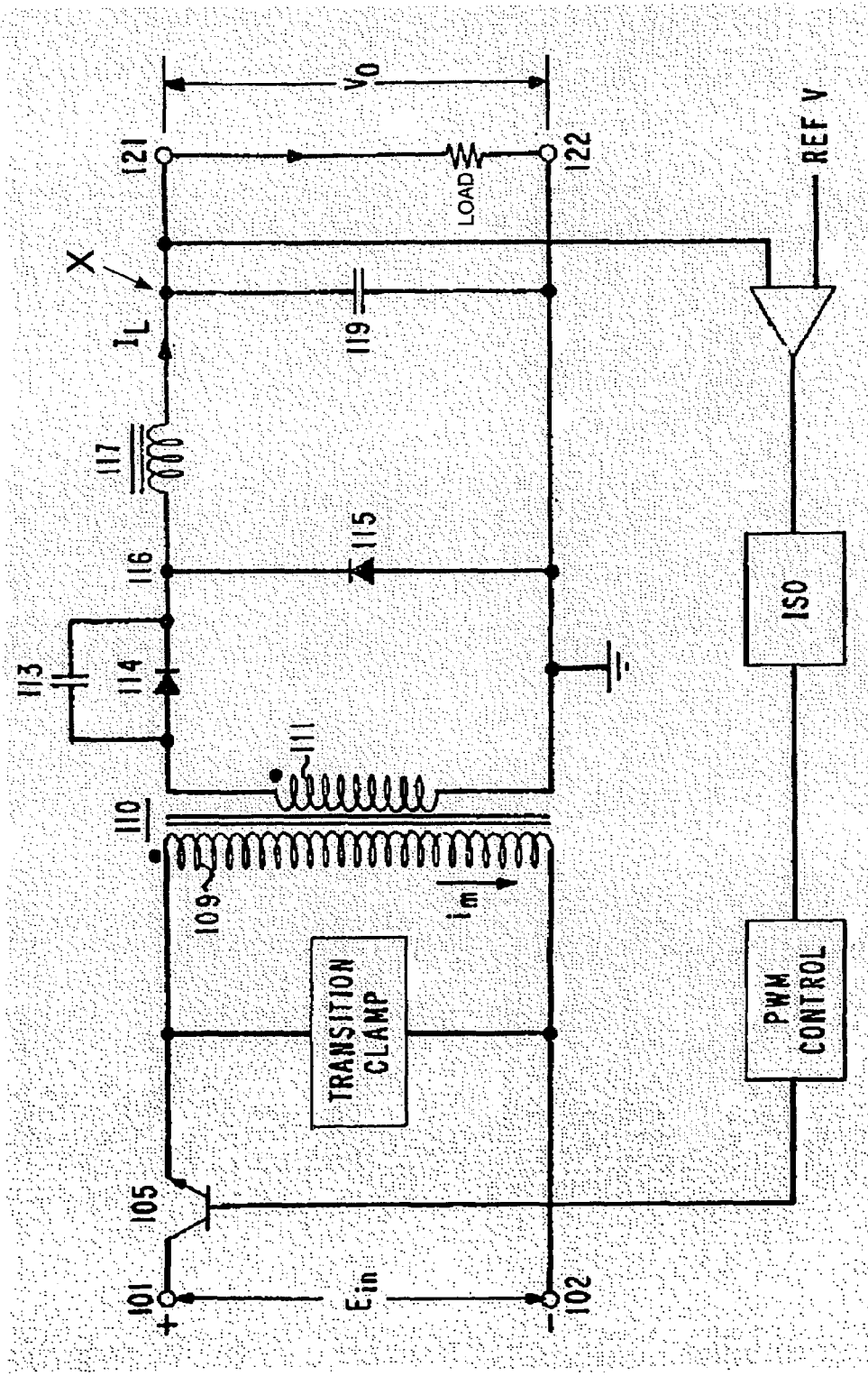
FIG. 1 shows an example of a forward converter according to the prior art.

Referring to FIG. 2a, this shows a fully resonant discontinuous mode forward converter 200 with a dc input 202 coupled to the primary winding 204 of a transformer 206, connected in series with a power switch 212. A resonant capacitor 214 is connected across the primary winding of the transformer and the dc input 202 is provided with a smoothing capacitor 216. On the output side of the forward converter a secondary winding 208 of the transformer provides power to a pair of dc output terminals 218 via a rectifier 220. A smoothing capacitor 222 is connected across the dc output terminals 218 and an output node at the junction of rectifier 220, smoothing capacitor 222 and a connection to one of the dc output terminals 218 is denoted "X". The current into node X, which flows to either or both of the smoothing capacitor 222 and output 218, is discontinuous, by contrast with the circuit shown in FIG. 1.

The switch 212 may comprise a bipolar or MOS transistor such as a MOSFET or IGBT, or some other device. The rectifier 220 may be implemented as a diode or by means of a MOS transistor. The resonant capacitor 214 may either comprise a discrete component, or may be entirely provided by parasitic capacitance, or may comprise a combination of the two.

The switch 212 is controlled by a controller 210 comprising a timing control module 210a and a switch control module 210b, the timing control module providing switch on and switch off signals 210c to the switch control module 210b. The timing control module may have one or more sense inputs, such as a voltage sense input and a current sense input as illustrated, or such sensing may be omitted and the timing control module 210a may operate substantially independently of any sensed condition of the forward converter circuit.

Where voltage sensing is employed the voltage on the primary winding of the transformer may be sensed, either directly or indirectly. For example the voltage may be sensed as shown by means of a connection to a junction between the primary winding and switch; alternatively, for example, a sensing voltage may be derived from an auxiliary winding of the transformer (not shown in FIG. 2a). Where current sensing is employed this may be conveniently implemented by sensing the voltage across a current sense resistor.

In operation the circuit of FIG. 2a converts the input dc voltage, typically relatively high, to an output dc voltage, typically in a range suitable for consumer electronic devices, for example between around 5V and 20V. In some preferred implementations, the dc output is isolated from the dc input, as shown in FIG. 2a; in other implementations secondary side feedback may be employed, in which case an opto-isolator may be included to provide isolation between the primary and secondary sides of the forward converter.

In general forward converters have a number of advantages including relatively small size and low cost: However conventionally they have been difficult to regulate and the components, particularly the switch, have been prone to failure under some load conditions and at start-up. Theoretically they have a good efficiency because they may be operated in resonant mode although the conventional freewheeling or flyback diode can prevent resonance from being achieved. Further, conventionally resonance is achieved by careful choice of component values allowing self-resonance, but this entails the use of components with a tight tolerance, which is costly and increases the difficulty of manufacture.

The arrangements we describe employ a controller 210 to control the timing of the switch 212 on and off, and this allows a variety of advantageous techniques to be employed. Thus we describe below how the forward converter of FIG. 2a can be made to operate reliably over a range of component values, how current limiting and start-up control can be employed (which both help to achieve reliable operation and which help to protect switch 212), and how switching timing can be controlled in a discontinuous resonant mode to achieve regulation.

FIG. 2b illustrates an example implementation of the controller 210 of FIG. 2a. A comparator 250 compares a sensed voltage with a reference voltage, for example zero volts, to provide a control signal 252 to a switch control unit 256 to control switch 212 on. The output of comparator 250 is also provided to a timer 258 which begins timing an on pulse width. When the timer times out a signal is provided on a second control line 254 to switch control unit 256 to control switch 212 off. Switch control unit 256 may comprise, for example, a set-reset latch together with interface circuitry for driving the base of a bipolar transistor and/or the gate of an MOS transistor. Preferably the circuit also includes an OR gate 260 with an input 262 from an over current protection line. This may be generated by a comparing a current sense input with a reference level defining a threshold for current limiting. When the over current protection input 262 becomes active the switch control unit 256 is immediately controlled to switch 212 off, thus implementing cycle-by-cycle current limit control.

Figure 3A:
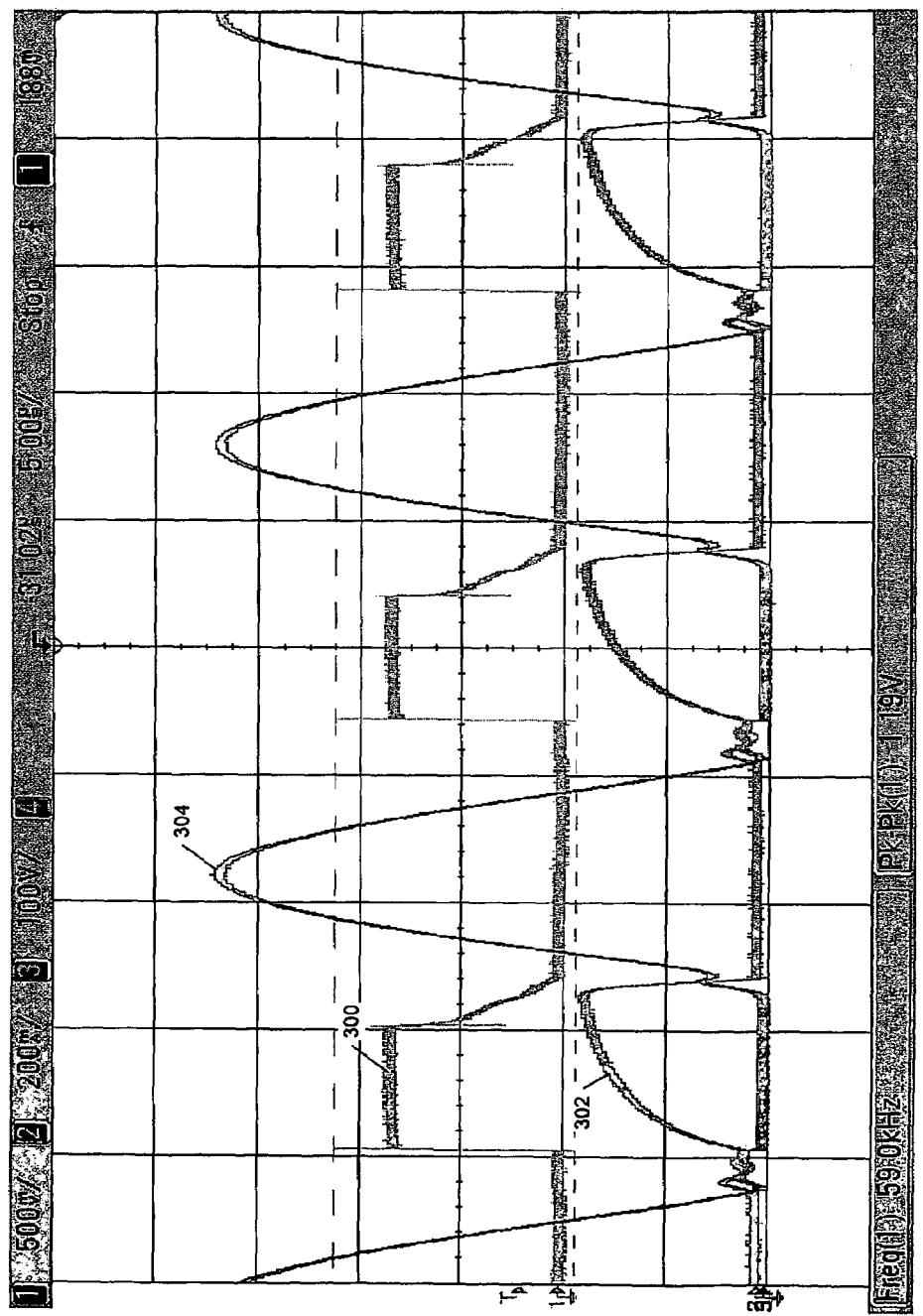
FIGS. 3a and 3b show example waveforms of the forward converter of FIG. 2a during operation from a 170V dc input supply providing output currents of, respectively, 1 A and 2 A.
Figure 3B:
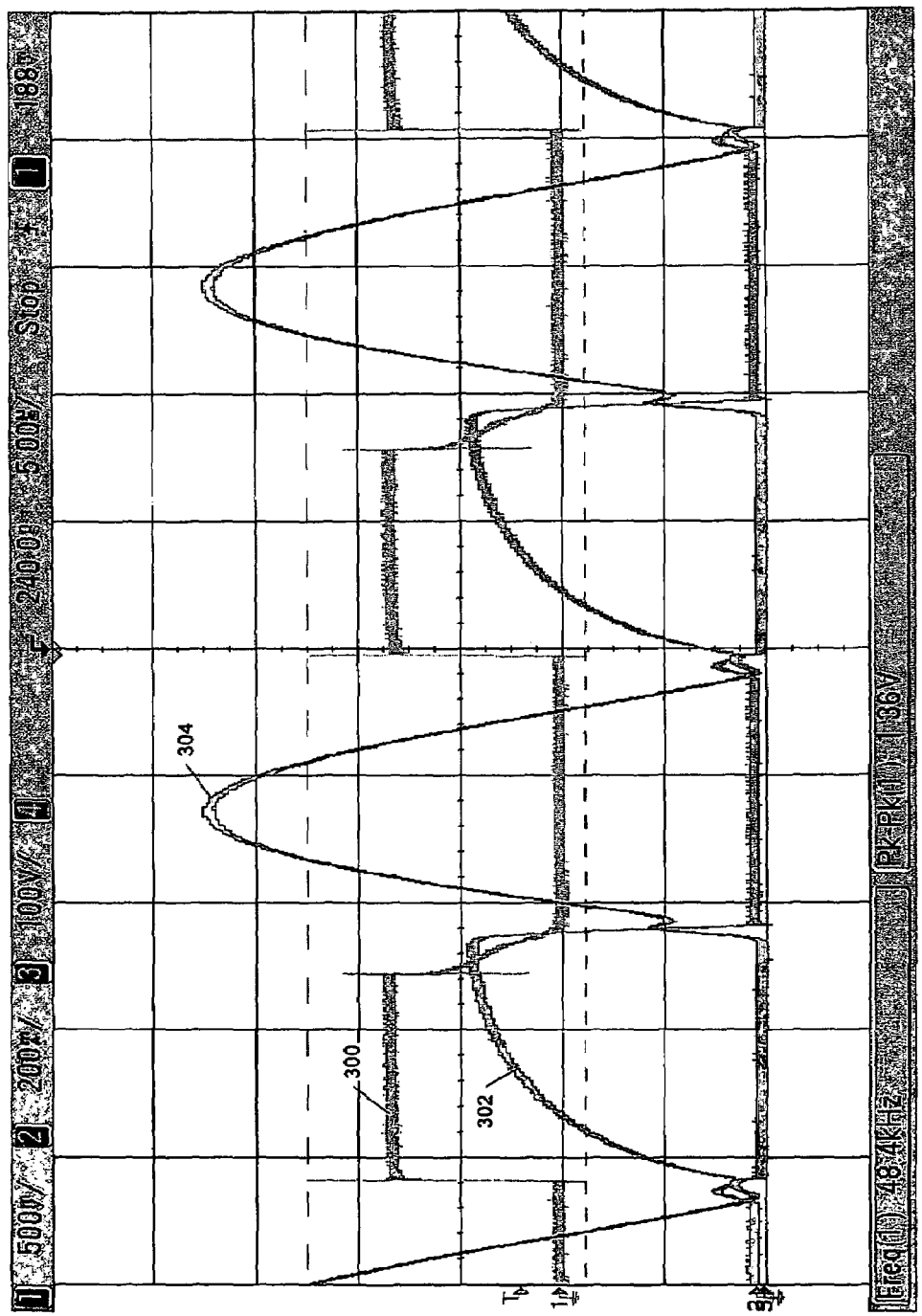

FIGS. 3a and 3b show example waveforms illustrating the operation of the forward converter of FIG. 2. In these figures (and similar later figures) waveform 300 indicates the drive voltage on the base of a bipolar transistor switch, waveform 302 shows a collector current, which is substantially equal to a current through the primary winding 204 of transformer 206 of the forward converter 200. The primary side current thus controls the flux in transformer 206 and hence also the secondary side current. Waveform 304 shows a voltage on the collector terminal of the bipolar transistor switch; when the switch is open this voltage, which is equal to the voltage on the primary winding 204 of transformer 206, is reflected on the secondary winding 208 of the transformer. When the switch is closed the current in the primary side of the transformer drives a current in the secondary side, thus charging smoothing capacitor 222 via rectifier 220; when the switch is open the primary side of the forward converter ceases to drive the secondary side and power is supplied to output terminals 218 from smoothing capacitor 222 (and diode 220 is off). In the waveforms of 3a and 3b the scale for waveform 300 is 500 mV per division, for waveform 302 is mA per division and for waveform 304 is 100V per division. In FIG. 3a the frequency of the drive waveform is approximately 59 KHz; in FIG. 3b the drive waveform has a frequency of approximately 48.4 KHz; Close inspection of waveform 300 reveals that the switch-off of the drive signal is not completely clean, which is due to the characteristics of the bipolar switch; waveforms 302 and 304 correspond.

Figure 4:
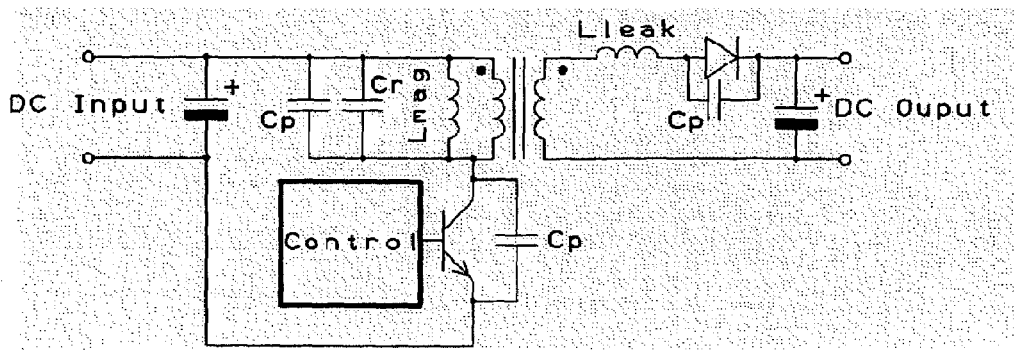
FIG. 4 shows an equivalent circuit model of a forward converter power supply according to an embodiment of the invention.

FIG. 4 shows an equivalent circuit for the discontinuous resonant forward converter of FIG. 2a. This shows the parasitic capacitance ($C_p$) of the bipolar transistor switch, output rectifier and transformer, as well as the resonant capacitor ($C_r$), a magnetising inductance (Lmag) which represents energy stored in a transformer and a leakage inductance (Lleak) which represents leakage inductance between the primary and secondary windings of the transformer (because some flux lines leak linking the primary and secondary coils so that they behave similarly to an inductor). Generally, but not necessarily, $C_r$ is much greater than $C_p$. In operation Lmag keeps the primary current flowing into $C_r$ causing resonance, and the secondary current approximately matches the primary current. The leakage inductance provides a degree of current limiting, in particular helping to reduce overload at start-up when the smoothing capacitor can effectively appear as a short circuit.

Figure 5A:
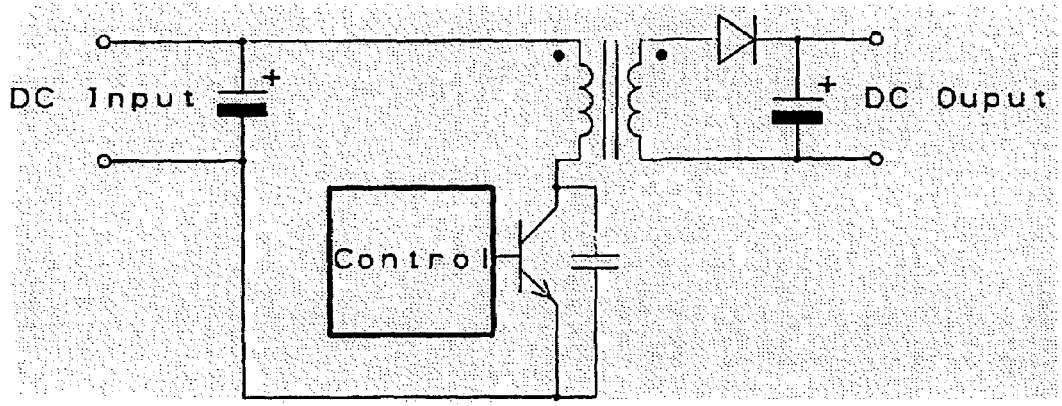
FIGS. 5a to 5d show alternative topologies for a forward converter according to an embodiment of the invention.
Figure 5B:
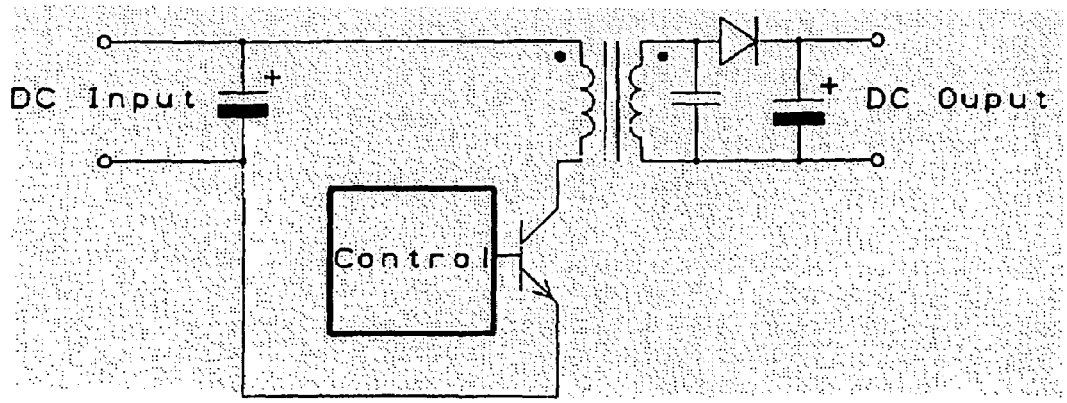
Figure 5C:
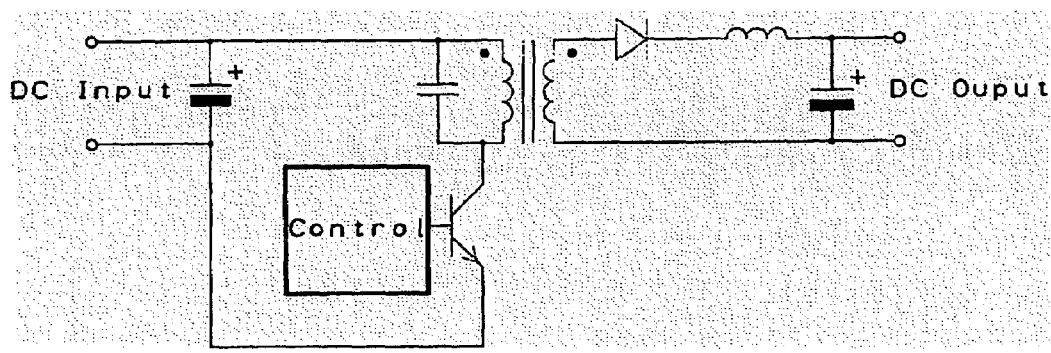
Figure 5D:
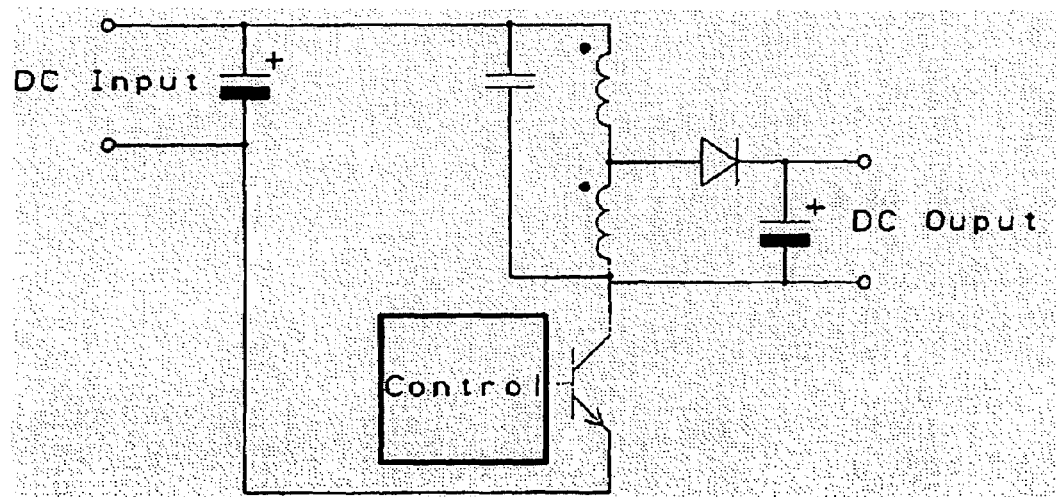

FIGS. 5a to 5d show alternative topological configurations for the resonant discontinuous forward converter. In FIG. 5a the resonant capacitor is coupled across the switch (in this example, shown as a bipolar transistor switch). In FIG. 5b the resonant capacitor is on the output side of the converter, more particularly, connected across the secondary winding of the transformer. In FIG. 5c a small inductor is explicitly included in series with the output rectifier. FIG. 5d illustrates a configuration of the forward converter in which an auto-transformer is employed.

Figure 6A:
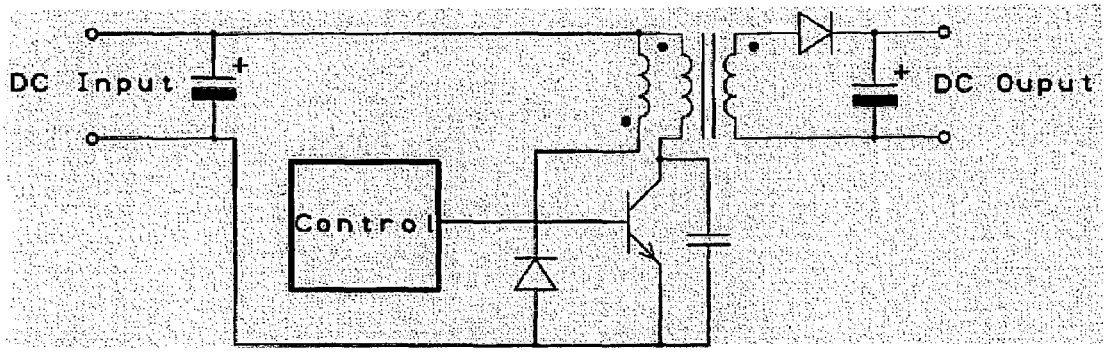
FIGS. 6a to 6c show examples of using an auxiliary winding to reset a transformer of a forward converter according to an embodiment of the invention.
Figure 6B:
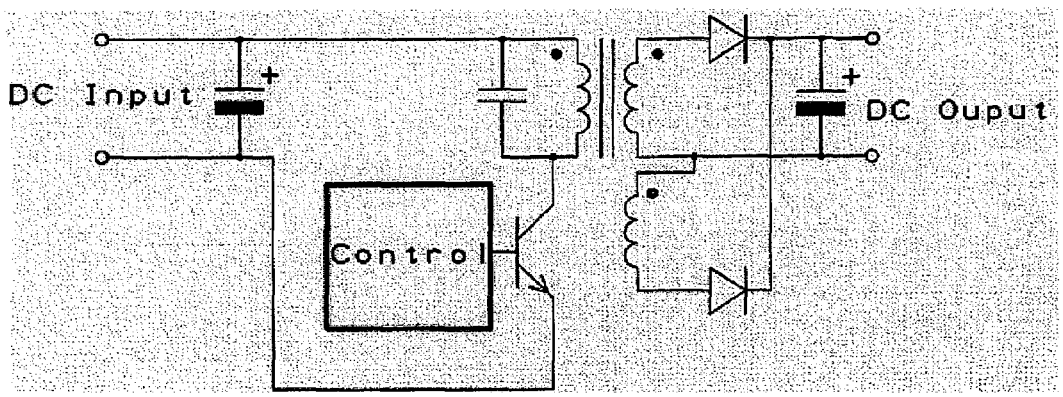
Figure 6C:
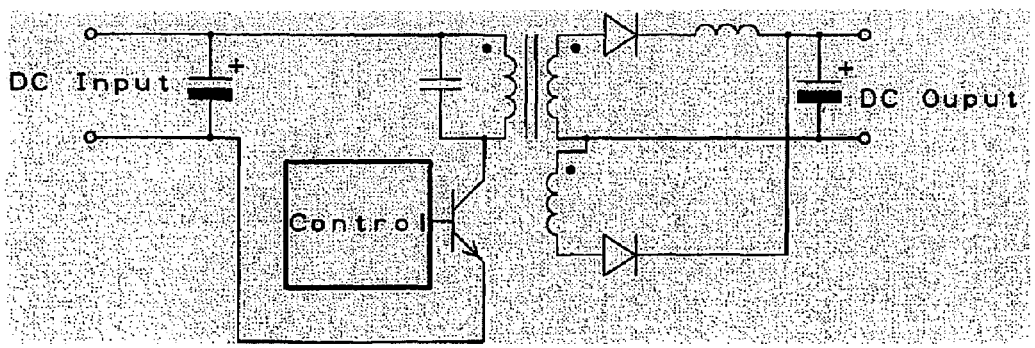

In embodiments the transformer is reset by the resonant portion of the transformer waveform: to demagnetise the transformer the magnetisation current discharges into the resonant capacitor and discharges resonantly. Additionally or alternatively the transformer may be reset by means of an auxiliary winding coupled in series with a rectifier. FIG. 6a shows an example of such a reset circuit in which a primary side auxiliary winding of the transformer has an opposite or inverted polarity compared with the primary and secondary windings of the transformer. During the off period of the switch a diode in series with the auxiliary winding becomes forward biased and conducts power back to the dc input (so that the technique is non-dissipative). FIGS. 6b and 6c show alternative configurations in which the auxiliary winding is placed on the secondary side of the transformer and (again) has an opposite polarity to the primary and secondary windings (the diodes on the secondary side are connected to opposite ends of the windings). In these examples the auxiliary winding is connected in series with a rectifier and across the secondary winding and rectifier, and optionally inductor, in the output side of the forward converter.

Referring again to FIGS. 2 and 3, it can be seen by comparing waveforms 304 and 300 that there is a short period after waveform 304 goes to substantially zero volts before the drive signal 300 to the bipolar transistor switch turns the switch on. If there were sufficient delays further resonance would eventually be seen in waveform 304 but nonetheless it can be appreciated that there is a range of periods during which the switch may be once again turned on and thus the switch may be controlled by detecting a substantially zero voltage level of waveform 304 after its resonant half cycle and then waiting for a delay (which may be zero) before turning the switch on. This tolerance in the operation of the circuit allows the switching timing (more specifically, the switch off time) to be sufficiently long to cope with a range of resonant frequencies, and hence resonant component values.

We next consider start-up of the forward converter. On start-up the output of the power supply appears as a short circuit. Unlike continuous forward converters, which employ a flyback diode, depending upon the load present on the RDFC insufficient energy may be transferred to the output of the converter to charge the output capacitor. This is particularly a problem where current limiting is employed since very high currents can appear on the primary side of the transformer and the current limiting can activate to switch off the drive signal which can have the consequence that, with certain loads, the output capacitor may not be charged.

Figure 7A:
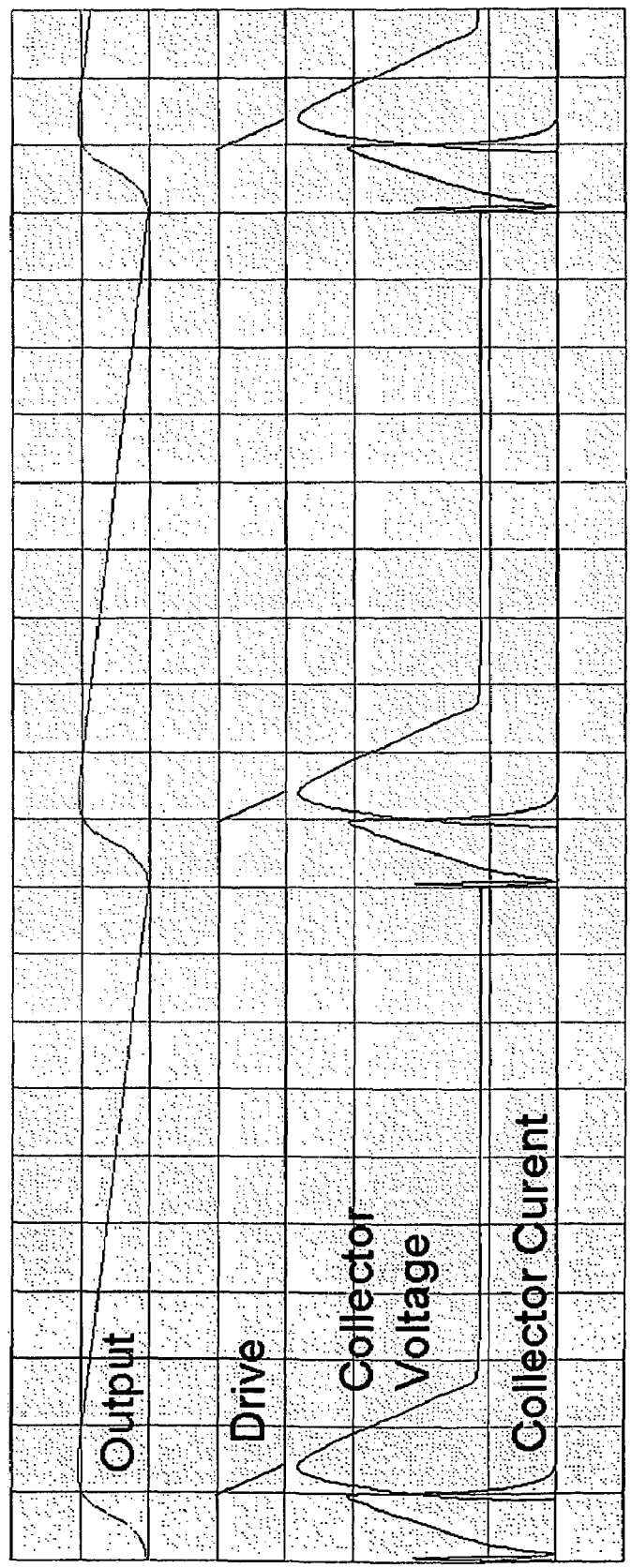
FIGS. 7a and 7b show waveforms for a forward converter respectively without and with high frequency control during start-up.

FIG. 7a illustrates this difficulty showing that, with current limiting, during start-up the output (voltage) of the power supply may not rise up to its correct value. Inspection of the collector voltage waveform also reveals that there is a non-zero component to this when the switch is off (because the secondary side output is reflected in reverse) and this non-zero collector voltage may be sensed in order to identify this start-up condition, as well as current limit, overload and short circuit if desired.

Figure 7B:

In preferred embodiments of the discontinuous resonant forward converter, the forward converter is controlled to operate in an increased frequency mode at start-up, for example at 5 or 10 times a normal frequency of operation. This may be implemented by means of a simple oscillator selected at start-up or the collector voltage may be sensed and used to control the switch on to invoke a higher frequency mode of operation. Operating the RDFC at an increased frequency increases the charge transferred to the output whilst still protecting the power switch. FIG. 7b illustrates this increased frequency operation (the time divisions are shorter than those shown in FIG. 7a) and it can be seen that the output voltage in this high-frequency start-up mode has an upward trend. Over time the output voltage increases to a normal operating output voltage for the forward converter.

We next describe current limiting systems for an embodiment of a discontinuous resonant forward converter according to the invention.

Once the RDFC has started up and achieved steady state operation, it operates in a resonant mode with an output (voltage) that tracks the input (voltage). However if an overload is applied, in particular when operating at a fixed frequency, the output current and hence the switch current will increase significantly and the circuit may be damaged. It is therefore desirable to sense the switch current in the RDFC and the controller we describe enables the drive to be shortened to control the drive current in an overload condition.

Figure 8A:
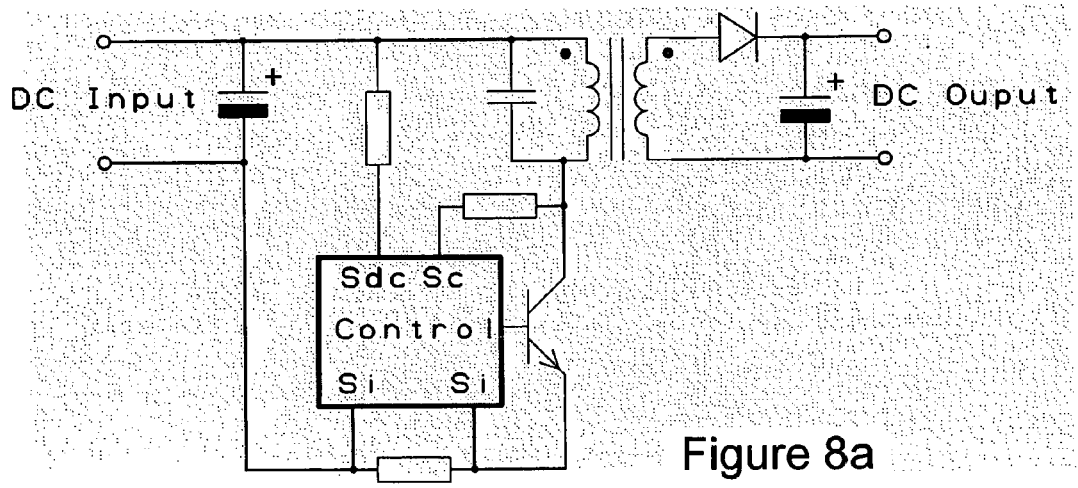
FIGS. 8a to 8c show, respectively, input sensing connections for an embodiment of a discontinuous resonant forward converter according to the invention. A forward converter in, respectively, overload and no load conditions.
Figure 8B:
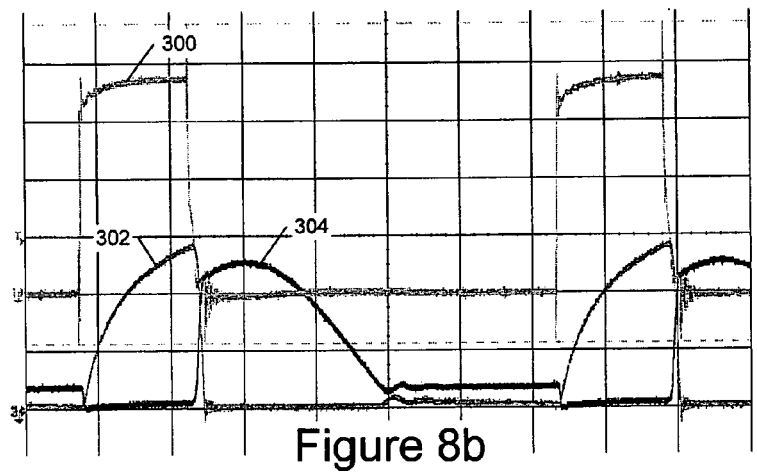
Figure 8C:
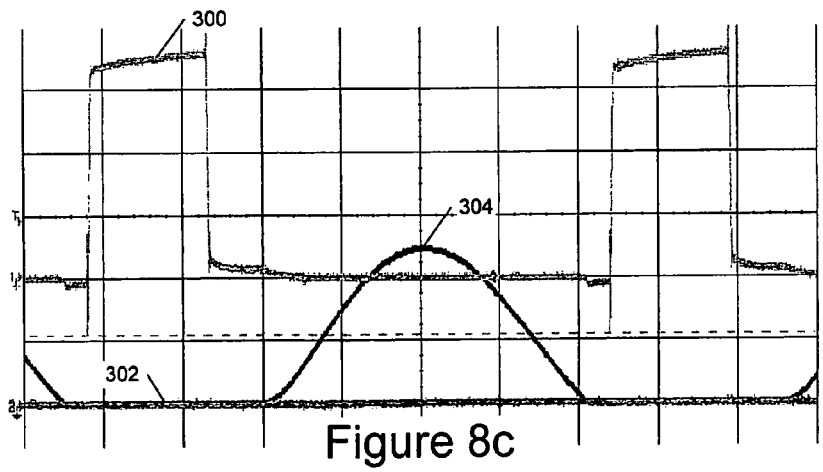

FIG. 8a shows an embodiment of an RDFC which includes a controller with current sense terminals (Si) as well as collector voltage (Sc) and dc input voltage (Sdc) sense inputs. FIG. 8b illustrates waveforms of a forward converter during overload, in which it can be seen that the collector voltage waveform is no longer properly resonant (the first portion of the half cycle having been truncated) because of loading by the output circuit. For comparison, FIG. 8c shows a forward converter under no-load conditions.

We have described above how over current protection may be implemented. However there are situations in which a fixed current limit converter can reduce the power transferred to the output, this in turn reducing the output voltage, which increases the output current, which can result in the converter output voltage falling significantly, even when the load is removed. In this situation it is possible that the forward converter may not recover. To address this one or more of a number of strategies may be employed. For example an increased frequency re-start may be employed, effectively as described above, to bring the output voltage back up to its normal operating level. Additionally or alternatively an output side inductance may be employed and/or the leakage inductance of the transformer may be controlled (generally allowed to increase) in order to provide a current limiting effect. Also, the current limit may be varied, increasing the current limit as the pulse width reduces. This latter strategy, in particular, is described in more detail later.

In more detail, in some applications, such as a constant current load, the output voltage may enter a state in which it continuously falls and in which the power supply is not able to deliver full power. By increasing the frequency in a similar manner to that described above during start-up the power delivered to the load can be increased, thus increasing the output voltage. In this way it is also possible to regulate whilst in current limit at a reduced output voltage; the leakage and/or a series inductance may also be employed to drop a part of the output voltage across this inductance.

When the forward converter is operating in a current limited mode it is nonetheless possible to regulate the output current by increasing the allowable switch current as the pulse width is reduced. This can be achieved safely in an RDFC according to an embodiment of the invention because the risk of damage to the converter is reduced with reducing pulse width. Combining this with the leakage inductance of the transformer and/or a series output inductance enables the output current to be regulated as the output voltage falls. Thus, broadly speaking the effect is that an increasing pulse width results in a reduced current limit.

Figure 9A:
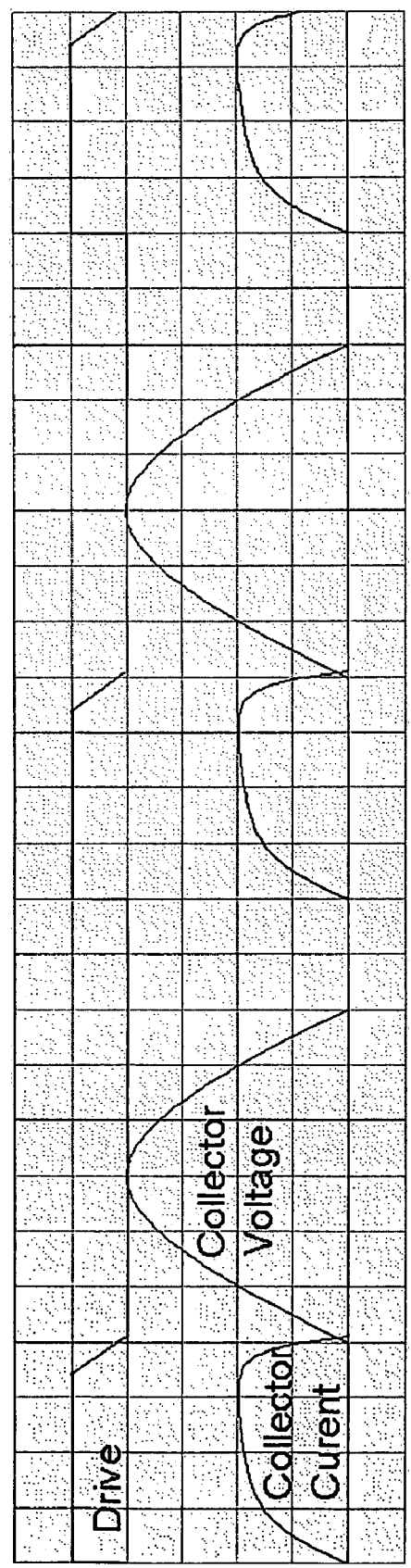
FIGS. 9a to 9c show examples of, respectively, late, early and target timings for waveforms of a forward converter.
Figure 9B:
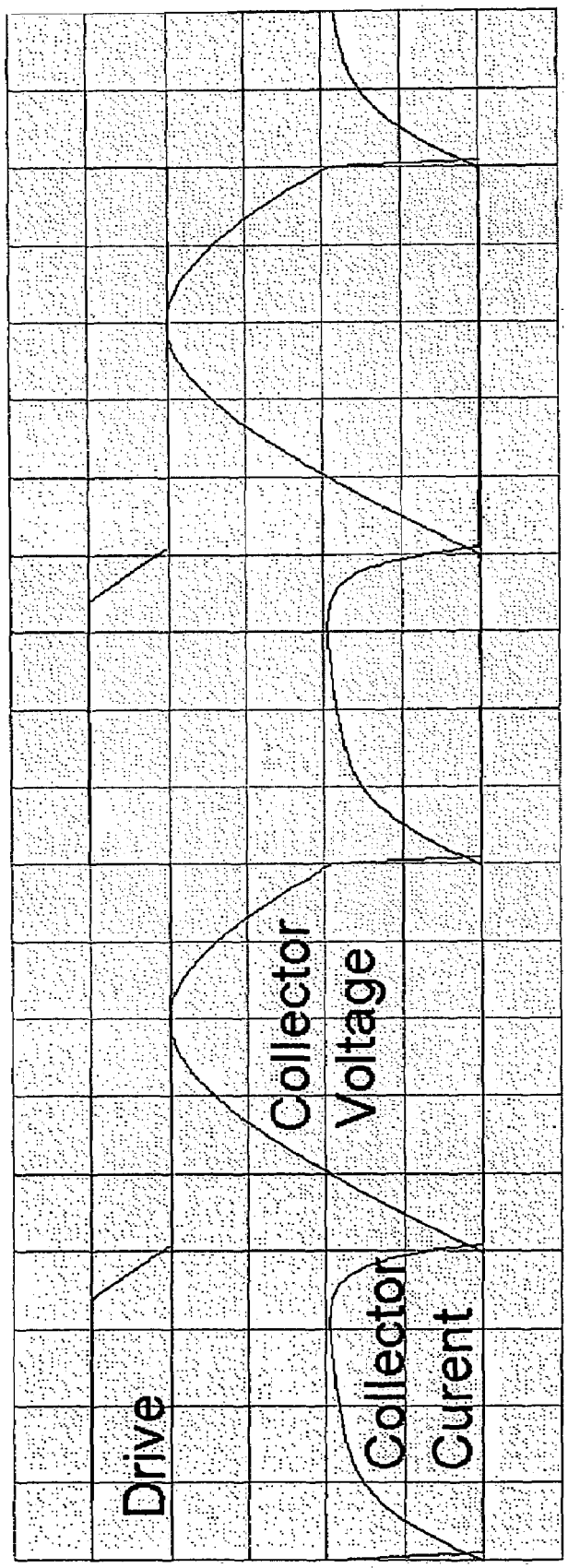
Figure 9C:
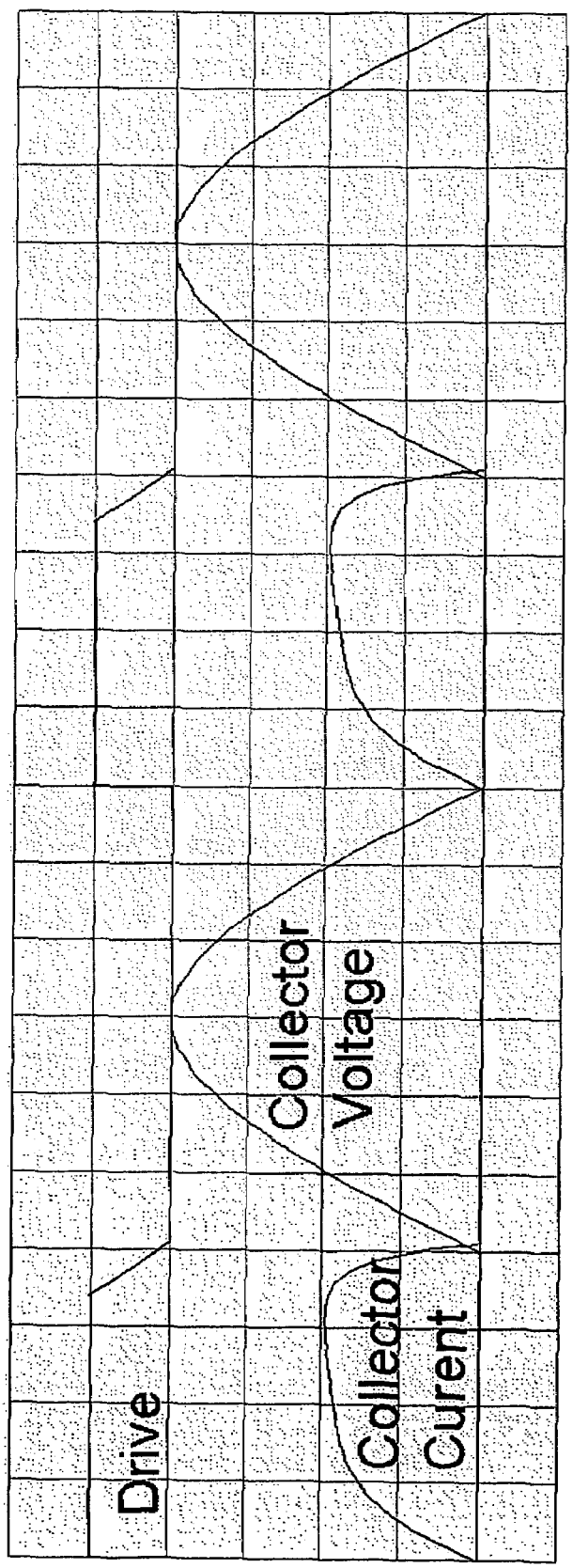

We now discuss further techniques which can be employed to compensate for the use of components with relatively wide tolerances. It is difficult to manufacture a power transformer with a tight tolerance primary magnetising inductance. One technique is to clean and glue the cores, but this is expensive. A tight tolerance resonant capacitor is also expensive. We have previously described how a fixed frequency oscillator in the controller can be employed together with a suitable choice of duty cycle to compensate for increased tolerances in these components. Another technique comprises compensating for tolerances by controlling the switch so that it turns on during the zero voltage phase of the primary (voltage) waveform. As previously described, there is a dead time while the switch voltage is at approximately zero volts (in practice the voltage may be slightly below ground potential). In zero voltage switching (ZFS) embodiments of the controller, the power switch is turned on during this time interval. FIGS. 9a to 9c illustrate different example timings for the switch drive with respect to the collector voltage waveform.

Referring to FIG. 9a, this shows an example in which zero voltage switching is achieved but in which the switch is turned on later than ideal. However this is preferable to turning the switch on too early, as shown in FIG. 9b, which can result in non-zero voltage switching, which causes switching losses and electromagnetic interference (EMI). FIG. 9c shows a preferred timing of the switch drive with respect to the collector voltage waveform.

A preferred timing of FIG. 9c can be achieved by sensing when the collector voltage is at zero volts and turning the switch on in response to this, either as soon as the collector voltage has fallen to zero, or a short time after the voltage has reached zero, or just as the collector voltage starts to rise again. The timing of FIG. 9c illustrates that of a "perfect" resonant switch, with the switch turning on just as the collector voltage reaches zero.

We next discuss regulation of the output voltage of an RDFC. In general the regulation can be poor due to relatively high leakage inductance and component (winding) resistances. The result of this is that as more load is applied to the converter, the output voltage falls. Further an RDFC can have difficulty in compensating for variations in input voltage and, in general, the output voltage tracks the input voltage. This can be a particular problem in forward converters run off a grid mains supply because the mains voltage can often vary significantly. However embodiments of the controller described above are suitable for implementation of one or both of pulse width and pulse frequency control in order to regulate the output voltage of an RDFC. More particularly, increasing the pulse width and/or increasing the frequency during either or both of low input and high load conditions can improve regulation.

Figure 10A:
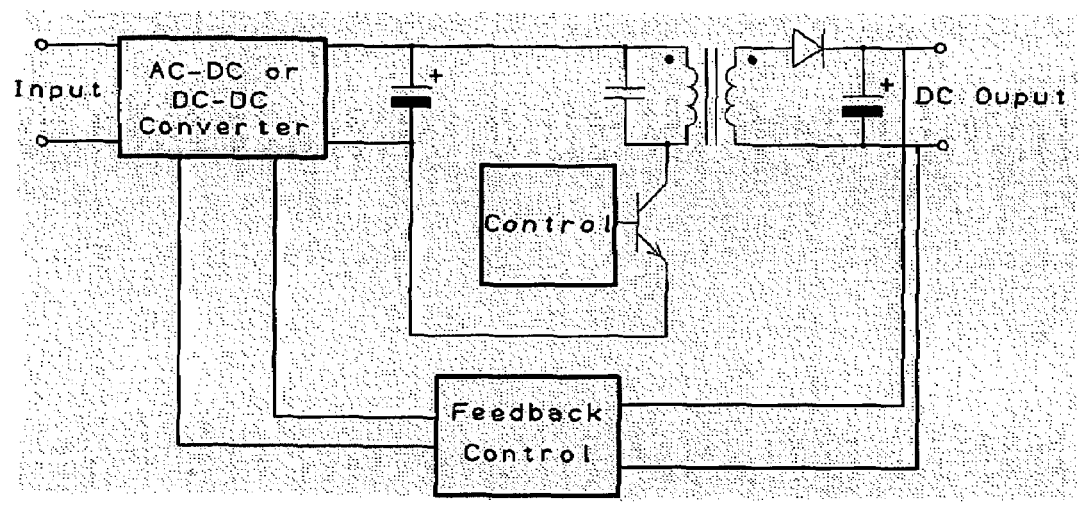
FIGS. 10a and 10b show, respectively regulation of a forward converter using secondary side feedback, and a multiphase forward converter circuit.

FIG. 10a shows another technique which may be employed for output voltage regulation. In this arrangement an input voltage converter, either an ac-to-dc or a dc-to-dc converter is used to provide a dc input power supply to the forward converter, and this is controlled by feedback from the secondary side of the forward converter. In order to regulate the output voltage. The input converter may comprise a boost or buck or PFC (Power Factor Correction) stage.

Figure 10B:
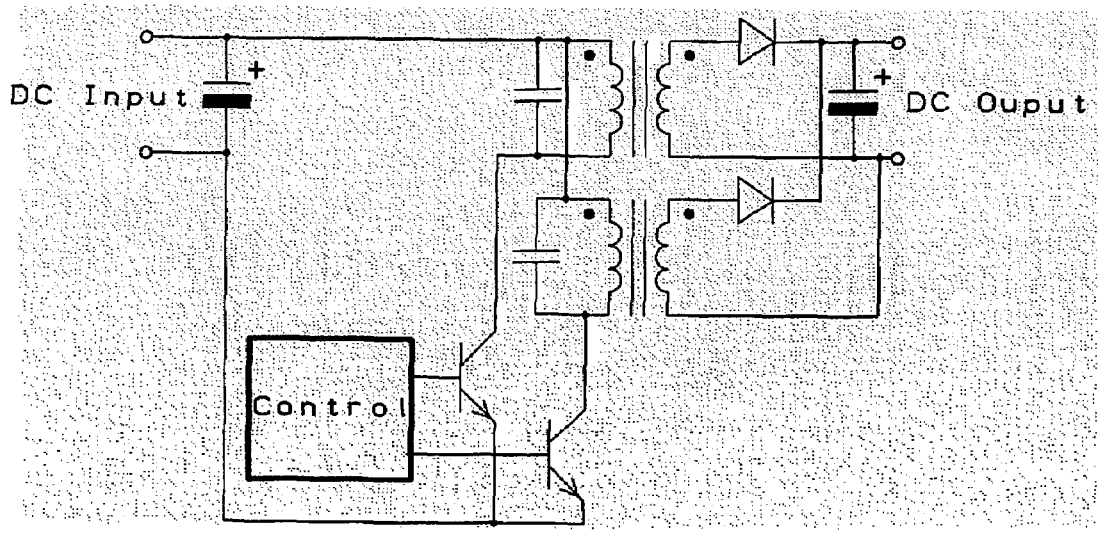

FIG. 10b illustrates the use of two power transformers in a multiphase configuration to improve output regulation. In the arrangement of FIG. 10b the switches are controlled so that each switch is only driven on when the other switch is off, creating complementary, but non-overlapping, drive waveforms. This technique is useful for small size forward converters according to embodiments of the invention operating at relatively high frequencies where regulation may be poor.

Broadly speaking we have described resonant discontinuous forward converters which employ a controller to analyse one or more inputs and determine turn-on and turn-off times for a power switch, providing a drive signal accordingly (although in simple embodiments a substantially fixed frequency/duty cycle drive may be employed). In embodiments the pulse width and/or frequency is adjusted in accordance with the resonance circuit in order to alleviate tolerance issues in the resonant components, either using sensing signals input to the controller or by means of a free-running oscillator.

Preferably, to ensure that the maximum energy is passed through the RDFC without significantly compromising the resonant behaviour and increasing losses or EMI the controller is configured to implement zero (switch) voltage switching. Preferably the controller is configured to terminate an on-pulse when an over current condition is detected, in order to protect the circuit (switch) and/or load. Preferably embodiments of the RDFC employ an increased frequency during start-up and/or current limit in order to assist the output voltage rise. Either or both of PWM and PFM techniques may be employed in order to improve load and line regulation.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A discontinuous resonant forward converter for converting an input dc voltage to an output dc voltage, the converter comprising:
    first and second dc inputs;
    a transformer having primary and secondary windings with matched polarities;
    a controllable switch for switching power from said dc inputs through said primary winding of said transformer, said controllable switch and said primary winding of said transformer being coupled in series between said first and second dc voltage inputs;
    first and second dc voltage outputs;
    a rectifier coupled to said secondary winding of said transformer, said rectifier and said secondary winding of said transformer being coupled in series between said first and second dc voltage outputs;
    a smoothing capacitor having a first connection coupled to receive dc power from said rectifier at a first connection node, said first connection node being coupled to said first dc voltage output, said smoothing capacitor having a second connection coupled to said second dc voltage output;
    a controller having an output coupled to said controllable switch and being configured to control said switch such that a voltage waveform on said secondary winding has a first portion during which said switch is on and current flows into said first connection node to provide a secondary loading current, and second portion during which said switch and said rectifier are both off;
    wherein substantially no current flows into said first connection node during said second portion of said voltage waveform;
    a resonant circuit to demagnetize the transformer during the second portion, the resonant circuit including magnetising inductance (Lmag) and leakage inductance (Lleak) of said transformer representing a level of energy stored in said transformer, a resonant characteristic of said resonant circuit varies in response to changes in energy stored in said transformer, which in turn is dependent on said secondary loading current just before turn off of said switch; and
    wherein said controller is configured to receive at least one input signal associated with energy stored in said transformer and control an on pulse width of said switch dependent on energy stored in said transformer such that said on pulse width is adjusted to maintain resonance with varying said secondary loading current.

2. A forward converter as claimed in claim 1 wherein a connection between said rectifier and said first connection node has an inductance, and wherein substantially no current flows in said inductance during said second portion of said waveform.

3. A forward converter as claimed in claim 1 lacking a freewheeling rectifier coupled to said secondary winding of said transformer.

4. A forward converter as claimed in claim 1 wherein said controller is configured to provide a switch drive signal to said controller output, said switch drive signal having an on period for controlling said switch to switch power to said primary winding on and an off period for controlling said switch to switch power to said primary winding off, and wherein said controller is configured to use a first control signal to start said drive signal on period and a second control signal to start said drive signal off period.

5. A forward converter is claimed in claim 4 wherein one or both of said first and second control signals is responsive to said level of stored energy in said transformer due to changes in said secondary loading current to vary a timing of said start of said drive signal off period.

6. A forward converter as claimed in claim 4 wherein said first control signal is responsive to a voltage on said primary or on an auxiliary winding of said transformer.

7. A forward converter as claimed in claim 6 wherein said first control signal is responsive to a value of substantially zero volts on said primary winding node connected to said switch of said transformer to start said drive signal on period.

8. A forward converter as claimed in claim 6 wherein said first control signal is responsive to a prediction of a value of substantially zero volts on said primary winding of said transformer to start said drive signal on period.

9. A forward converter as claimed in claim 5 wherein said drive signal off period is sufficiently long for said resonant portion of said secondary winding voltage waveform to include substantially half a cycle of substantially sinusoidal resonance, wherein said first control signal identifies an end of said half cycle, and wherein said controller is configured to start said drive signal on period following a delay from said end of said half cycle.

10. A forward converter as claimed in claim 4 wherein said first control signal is responsive to a voltage on an auxiliary winding of said transformer.

11. A forward converter as claimed in claim 4 wherein said controller includes a current limiting system and a system for controlling said switch drive signal such that, responsive to implementation of current limiting, a frequency of said switch drive signal is increased.

12. A forward converter as claimed in claim 1 wherein said controller includes a system for controlling said output to said switch such that, during start-up of said converter, a frequency of a drive signal to said switch is increased.

13. A forward converter as claimed in claim 1 wherein said controller includes a system for controlling said output to said switch such that, during start-up of said converter, said converter operates in a non-resonant mode.

14. A forward converter as claimed in claim 1 wherein said controller comprises a single integrated circuit.

15. A controller for controlling a discontinuous forward converter for converting an input dc voltage to an output dc voltage, the converter comprising:
first and second dc inputs;
a transformer having primary and secondary windings with matched polarities;
a controllable switch for switching power from said dc inputs through said primary winding of said transformer, said controllable switch and said primary winding of said transformer, being coupled in series between said first and second dc voltage inputs;
first and second do voltage outputs;
a rectifier coupled to said secondary winding of said transformer, said rectifier and said secondary winding of said transformer being coupled in series between said first and second dc voltage outputs; and
a smoothing capacitor having a first connection coupled to receive dc power from said rectifier at a first connection node, said first connection node being coupled to said first dc voltage output, said smoothing capacitor having a second connection coupled to said second dc voltage output; and
a controller having an output coupled to said controllable switch and is configured to control said switch such that a voltage waveform on said secondary winding has a first portion during which said switch is on and current flows into said first connection node to provide a secondary loading current, and second portion during which said switch and said rectifier are both off; and wherein substantially no current flows into said first connection node during said second portion of said voltage waveform;
a resonant circuit to demagnetize the transformer during the second portion, the resonant circuit including magnetising inductance (Lmag) and leakage inductance (Lleak) of said transformer representing a level of energy stored in said transformer, a resonant characteristic of said resonant circuit varies in response to changes in energy stored in said transformer, which in turn is dependent on said secondary loading current just before turn off of said switch; and
wherein said controller is configured to receive at least one input signal associated with energy stored in said transformer and control an on pulse width of said switch dependent on energy stored in said transformer such that said on pulse width is adjusted to maintain resonance with varying said secondary loading current.

16. An integrated circuit including the controller of claim 15.

17. A method of controlling a forward converter, the converter comprising:
first and second dc inputs;
a transformer having primary and secondary windings with matched polarities;
a controllable switch for switching power from said dc inputs through said primary winding of said transformer, said controllable switch and said primary winding of said transformer being coupled in series between said first and second dc voltage inputs;
first and second dc voltage outputs;
a rectifier coupled to said secondary winding of said transformer, said rectifier and said secondary winding of said transformer being coupled in series between said first and second dc voltage outputs; and
a smoothing capacitor having a first connection coupled to receive dc power from said rectifier at a first connection node, said first connection node being coupled to said first dc voltage output, said smoothing capacitor having a second connection coupled to said second dc voltage output;
the method comprising controlling said controllable switch such that a voltage waveform on said secondary winding has a first portion during which said switch is on and current flows to provide a secondary loading current into said first connection node, and second portion during which said switch and said rectifier are both off; and wherein substantially no current flows into said first connection node during said second portion of said voltage waveform;

wherein the converter comprises a resonant circuit to demagnetize the transformer during the second portion, the resonant circuit including magnetising inductance (Lmag) and leakage inductance (Lleak) of said transformer representing a level of energy stored in said transformer, a resonant characteristic of said resonant circuit varies in response to changes in energy stored in said transformer, which in turn is dependent on said secondary loading current just before turn off of said switch; and wherein the method further comprises:

receiving at least one input signal associated with energy stored in said transformer;

controlling an on pulse width of said switch dependent on energy stored in said transformer such that said on pulse width is adjusted to maintain resonance with varying said secondary loading current.

18. A discontinuous resonant forward converter as claimed in claim 1 wherein said controllable switch is a bipolar transistor minority carrier device having a collector terminal coupled to said primary winding of said transformer.

19. A discontinuous resonant forward converter as claimed in claim 1 wherein said at least one input signal is a current sense signal of a primary current through the transformer wherein said secondary load current approximately matches the primary current.

* * * * *

UNITED STATES PATENT AND TRADEMARK OFFICE
CERTIFICATE OF CORRECTION

PATENT NO. : 7,570,497 B2  
APPLICATION NO. : 11/449486  
DATED : August 4, 2009  
INVENTOR(S) : Russell Jacques and David Robert Coulson It is certified that error appears in the above-identified patent and that said Letters Patent is hereby corrected as shown below:

On the title page item (73), the Assignee's name on the above-identified patent is incorrect.

The incorrect name appears as "Cambridge Semiconductor".

The correct name should be printed as --Cambridge Semiconductor Limited--.

Signed and Sealed this

Eighth Day of December, 2009

David J. Kappos  
*Director of the United States Patent and Trademark Office*